United States Patent [19]
Tasci et al.

[11] Patent Number: 5,563,513
[45] Date of Patent: Oct. 8, 1996

[54] ELECTROMAGNETIC IMAGING DEVICE AND METHOD FOR DELINEATING ANOMALOUS RESISTIVITY PATTERNS ASSOCIATED WITH OIL AND GAS TRAPS

[75] Inventors: M. Tahsin Tasci, Denver; John M. Jordan, Golden, both of Colo.

[73] Assignee: Stratasearch Corp., Golden, Colo.

[21] Appl. No.: 165,017

[22] Filed: Dec. 9, 1993

[51] Int. Cl.$^6$ ........................................... G01V 3/02
[52] U.S. Cl. ................................................... 324/359
[58] Field of Search ................................. 324/347, 354, 324/357, 359, 360, 362, 334, 336, 239

[56] References Cited

U.S. PATENT DOCUMENTS

| | | | |
|---|---|---|---|
| 2,735,980 | 6/1956 | Wait | 324/360 |
| 3,315,155 | 4/1967 | Colani | 324/239 |
| 3,810,000 | 5/1974 | Aspinall et al. | 324/357 |
| 3,959,721 | 5/1976 | Roschuk et al. | 324/359 |
| 4,296,379 | 10/1981 | Yoshizumi | 324/357 |
| 4,446,434 | 5/1984 | Sternberg et al. | 324/357 |
| 4,835,473 | 5/1989 | Bostick, Jr. | 324/357 |
| 4,835,474 | 5/1989 | Farra et al. | 324/357 |
| 4,837,514 | 6/1989 | Spies | 324/357 |
| 4,942,361 | 7/1990 | Gast et al. | 324/360 |

Primary Examiner—Sandra L. O'Shea
Assistant Examiner—Roger Phillips
Attorney, Agent, or Firm—Edwin H. Crabtree; Donald W. Margolis; Ramon L. Pizarro

[57] ABSTRACT

A method and apparatus used in providing resistivity measurement data of a sedimentary subsurface for developing and mapping an enhanced anomalous resistivity pattern. The enhanced subsurface resistivity pattern is associated with and an aid for finding oil and/or gas traps at various depths down to a basement of the sedimentary subsurface. The apparatus is disposed on a ground surface and includes an electric generator connected to a transmitter with a length of wire with grounded electrodes. When large amplitude, long period, square waves of current are sent from a transmission site through the transmitter and wire, secondary eddy currents are induced in the subsurface. The eddy currents induce magnetic field changes in the subsurface which can be measured at the surface of the earth with a magnetometer or induction coil. The magnetic field changes are received and recorded as time varying voltages at each sounding site. Information on resistivity variations of the subsurface formations is deduced from the amplitude and shape of the measured magnetic field signals plotted as a function of time after applying appropriate mathematical equations. The sounding sites are arranged in a plot-like manner to ensure that areal contour maps and cross sections of the resistivity variations of the subsurface formations can be prepared.

17 Claims, 6 Drawing Sheets

TOTAL CONDUCTANCE (MHOS)   • Producing Oil Well
                            ⌗ Dry Hole

FIG. 7

TOTAL CONDUCTANCE (MHOS)
   • Producing Oil Well
   ⌗ Dry Hole

ELECTROMAGNETIC IMAGING DEVICE AND METHOD FOR DELINEATING ANOMALOUS RESISTIVITY PATTERNS ASSOCIATED WITH OIL AND GAS TRAPS

BACKGROUND OF INVENTION (a) Field of the Invention

This invention relates to the developing of an enhanced anomalous resistivity pattern in a geological sedimentary subsurface and more particularly, but not by way of limitation, to a method and apparatus for providing enhanced resistivity subsurface patterns associated with oil and gas traps.

(b) Discussion of Prior Art

Heretofore, there have been a number of different U.S. Patents which describe the use of electrical current passed through the earth's surface for measuring an electric field and magnetic field in the subsurface along with measuring resistivity of rock formations. For example in U.S. Pat. No. 2,730,673 to Jakosky, an older electromagnetic method of subsurface surveying is described using an electric current passed through the earth's surface for measuring an induced magnetic field created by the current flow. In U.S. Pat. No. 2,796,235 to Quigley a process of geophysical prospecting particularly in areas of high electrical resistivity such as gilsonite dikes is disclosed.

U.S. Pat. Nos. 4,041,372 to Miller et al., 4,446,434 to Sternberg et al., 4,467,283 to Owen et al. disclosed geophysical exploration systems using a plurality of spaced apart probes with addressable switching units for providing calculable electromagnetic coupling for indirect detection of hydrocarbon reservoirs. The resistivity of the rock is measured and compared with anomaly models using a method of comparing measured phase angle differences between stored current characteristics and stored voltage characteristics. The methods described in these patents have limited depth of penetration in the subsurface.

U.S. Pat. No. 4,835,473 to Bostick describes a method of determining resistivity using a dc current source wherein variations in the earth's magnetic field are measured in two, non-parallel directions. U.S. Pat. No. 4,837,514 to Spies describes a method of reducing noise during electromagnetic exploration and U.S. Pat. No. 4,875,015 to Ward discusses an improved method related to borehole resistivity.

None of the above mentioned patents disclose or teach a method and apparatus for specifically looking for hydrocarbon traps wherein rock formation resistivity changes take place above a potential oil and gas reservoir and further used to penetrate an entire sedimentary section down to basement rock and below to depths up to 20,000 feet, and deeper under certain conditions. Also, none of these patents discuss using a method coupled with removing a horizontally layered earth model in order to enhance the anomalous resistivity pattern caused by the presence of an oil and gas accumulation.

Because the subject invention has a large depth of penetration with a high degree of resolution in measuring rock resistivity, it is ideally suited for oil and gas exploration.

SUMMARY OF THE INVENTION

In view of the foregoing, it is a primary object of the present invention to provide a method for delineating oil and gas traps by mapping anomalous resistivity patterns deep in a sedimentary subsurface down to and including a crystalline basement. The resistivity pattern anomalies are closely associated with the hydrocarbon accumulations. The invention provides for cross sections and areal contour maps of resistivity variations of the subsurface down to 20,000 feet and deeper.

A further object of the invention is to provide a method and apparatus which will allow for enhanced resistivity measurements of an entire sedimentary section down to and including a portion of the crystalline basement, while allowing for elimination of misleading shallow distortions near the ground surface near the receiver site, caused by power lines, pipelines, railroad tracks, ground water, lithogy variations, and other man made and natural conditions. Another object of the invention is to provide a method and apparatus used in receiving magnetic field signals from a deep subsurface and deducing resistivity variations therefrom. The resistivity patterns that are derived are used for providing enhanced cross sections and areal contour maps of the subsurface resistivity variations.

Still another object of the subject invention is to provide oil and gas exploration companies with a viable, low cost alternative to using only seismic exploration methods. Further the subject method can be used to compliment current seismic exploration for verification of an anomaly. Also, the invention provides greatly enhanced and robust anomalous resistivity patterns in a subsurface which heretofore were not recognized using standard exploration methods and devices.

A further object of the invention is that the apparatus is easily portable, is usable for both land and water exploration, and can be used to explore difficult terrains and areas which have not been conducive to seismic investigation. While the invention is described as a valuable tool for discovering oil and gas accumulations, it can also be used for investigating various formations when searching for other minerals in sedimentary or non-sedimentary environments. Also, the invention can be used for developing an oil and gas field after an initial discovery well by outlining the field prior to drilling more wells.

The subject invention includes an electric generator connected to a transmitter with a length of wire with grounded electrodes. The length of the wire will vary depending on geoelectric characteristics of an area under investigation. When large amplitude, long period, square waves of current are sent from a transmission site through the transmitter and wire, the square waves of current induce secondary eddy currents in the subsurface. The eddy currents induce magnetic field changes in the subsurface which can be measured at the surface with a magnetometer or an induction coil. The magnetic field changes are received and recorded as time-varying voltages at each sounding site. The sounding site includes a magnetic field receiver such as an induction coil or magnetometer for receiving the signals and a portable receiving station including amplifiers, filters, analog to digital converter, and computer recording and processing equipment. Information on resistivity variations of the subsurface formations is deduced from the amplitude and shape of the measured magnetic field signals plotted as a function of time, which is equatable with depth, after applying appropriate mathematical equations. The sounding sites are arranged in a plot-like manner to ensure that cross sections or areal contour maps of the resistivity variations of the subsurface can be prepared.

These and other objects of the present invention will become apparent to those familiar with oil and gas exploration methods and equipment from the following detailed description, showing novel construction, combination, method, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

As a basis of background information for the reader and points of reference, electrical conduction in the earth is electrolytic for most rocks near the earth's surface such as in sedimentary basins. That is, the propagation of current is by ionic conduction. The conductivity of a porous rock varies with the volume and arrangement of the pores and even more with the conductivity and amount of contained water.

Of all the physical properties of rocks, electrical resistivity shows the greatest variation. Very roughly, igneous rocks have the highest resistivity, sediments the lowest with metamorphic rocks being intermediate. In addition, the resistivities of particular rock types vary directly with age and lithology, since the porosity of the rock and salinity of the contained water are affected by both. In all cases, a small change in the percentage of water affects the resistivity enormously.

A great deal of work has been done in the past in correlating resistivity with water content for petroleum-bearing rocks. For these rocks, which are primarily porous sandstones and limestones, it has been observed that resistivity varies approximately as the inverse square of the porosity when the rock is fully saturated with water. This observation has led to the widespread use of an empirical function relating resistivity and porosity which is known as Archie's Law:

$$R_t = [R_w/(S_w \times \phi^m)]^{1/n}$$

where R is the resistivity of the rock, Rw is the resistivity of the formation water, Sw is water saturation, $\phi$ is porosity, m is cementation factor, and n is the saturation exponent. Resistivity of a rock increases with increasing water resistivity, increasing oil saturation, decreasing water saturation, and decreasing porosity. Pore geometry is expressed by the cementation factor m.

In addition, temperature and mineralogy can also affect the resistivity values. An increase in temperature or an increase in clay or pyrite content can reduce the resistivity of a rock formation.

Oil and gas traps are divided into three general categories: structural, stratigraphic, and combination traps. A trap must have a reservoir which is porous and permeable and contains recoverable hydrocarbons and associated fluids. A trap must have a seal so that not all of the hydrocarbons migrate out of the reservoir, and hydrocarbons must migrate from the source rocks into the reservoir. Within the framework of a basin, traps are lithologically and geometrically anomalous areas.

When the migration of oil and gas from the source rock into the trap takes place, large volumes of water pass through the trap. During and after the development of the trap, hydrocarbons continue their migration. As a result of this on-going process, hydrocarbon content of the non-reservoir rock above and somewhat below the reservoir is increased. The hydrocarbon content of the non-reservoir rock decreases with increasing distance from the reservoir. The same section also undergoes a number of diagenetic changes such as cementation and mineralization which are porosity modifying processes.

All of the above factors affect the resistivities and it is very important to note that even though the geologic section affected in most cases can be several thousand feet thick, the amplitude of the changes increases close to the reservoir. Therefore, a large percentage of the resistivity change is caused by the rock very close to and directly above the reservoir. Thus, the resistivity pattern which distinguishes the hydrocarbon trap is very closely associated with the accumulation itself. Because oil and gas traps have anomalous lithologies, geometries, and fluids, and they exhibit increased hydrocarbon content above the reservoir and some distance below the reservoir, and also, because hydrocarbon traps are ideal environments for enhanced diagenetic changes which modify rock porosity and permeability, oil and gas fields in most cases, if not all cases, manifest themselves as robust resistivity anomalies.

Figure 1:
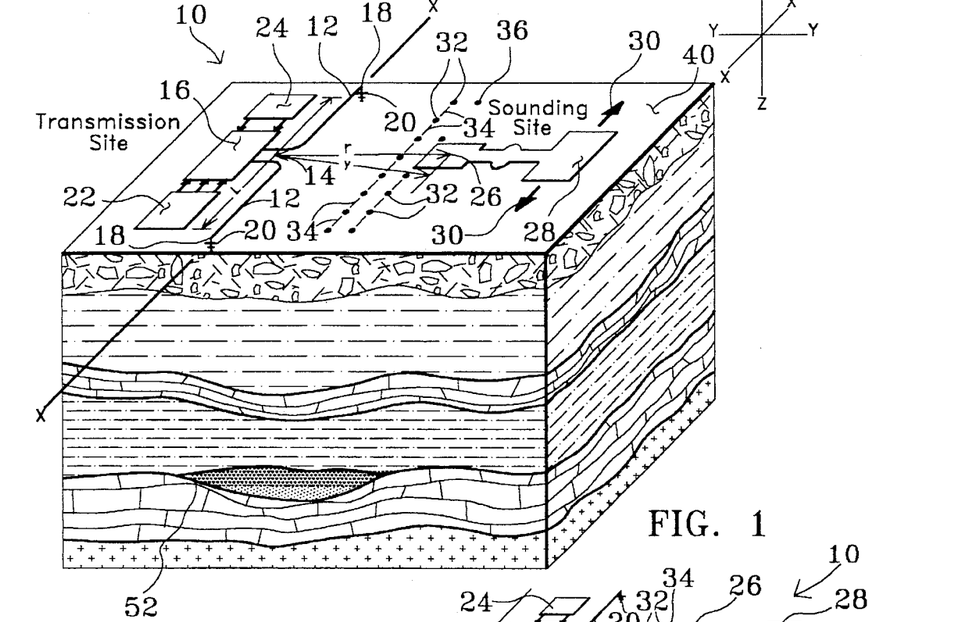
FIG. 1 is a perspective view of a portion of a section of the earth with a field layout of the invention for providing resistivity measurement data of the sedimentary subsurface down to and including a portion of the basement rock.

In FIG. 1 a preferred field layout of the apparatus used for providing anomalous resistivity patterns associated with oil and gas traps is illustrated and designated by general reference numeral 10. The apparatus 10 includes a pair of transmission lines 12 having a first end 14 attached to a transmitter 16 and a second end 18 attached to grounded electrodes 20. The transmitter 16 is attached to a generator 22 and a synchronization clock 24. In this drawing, the transmission lines 12 are shown disposed along a horizontal "X" axis. A square loop transmitter of ungrounded wire can also be used in place of the transmission lines 12 and the grounded electrodes 20. The length between the two grounded electrodes 20 can vary from a few thousand feet to 2 or more miles long. Also, the length of one side of the ungrounded square loop transmitter can vary from 1000 feet to 1 mile or more depending on the field conditions. The measurements provided by the apparatus 10 can be made on both land and water.

Commonly, measurements are made in the time-domain and the period of the square waves transmitted through the transmission lines 12 varies from about 1 second to 50 seconds, depending on the conductance of the earth in the area being surveyed. The amplitude of the square wave is 50–300 amperes or larger. The measurements can also be made in the frequency domain. The frequency range will depend on the total thickness and the resistivity of the subsurface section under investigation. Generally the frequency range is from about 0.02 Hz to 100 Hz. When the grounded electrodes 20 are used, several pieces of metal are buried at a depth of about 2 feet or more after adding electrolyte and water in order to maximize the current by decreasing the contact resistance of the electrodes.

When a square-wave electric current is sent through a grounded transmission line 12, the electrical current step induces eddy currents in the subsurface. These secondary fields diffuse downwards and outward with increasing time and depth. Each current step induces a new system of eddy currents in the subsurface which induces magnetic field changes. These magnetic field changes are measured with a magnetic field receiver 26 and recorded at a sounding site. The magnetic field receiver 26 may be an induction coil, a flexible induction loop, a magnetometer or like receivers. Information on the subsurface resistivity structure is deduced from the amplitude and shape of the magnetic signals after applying appropriate mathematical equations. The information from receiver 26 is fed into a moveable data receiving station 28 having an on board computer with amplifiers, filters, analog to digital converter and a digital recording system. The movement of the receiving station 28 is indicated by arrows 30.

When a sounding is recorded at a sounding site, the resistivity variations observed are caused by the subsurface changes below that sounding site. In order to measure the vertical magnetic fields, a horizontal loop sensor is used. Vertically diffusing horizontal current loops below the sensor cause the vertical magnetic field transients. The sensor first detects the changes immediately near it, and with increasing time, it detects the changes at increasingly greater depth. The sensor will detect changes at a distance from the sounding site; however, the influence of these changes on the soundings is greatly reduced with increasing distance from the sensor. For this reason a sounding represents the resistivity changes of the subsurface below the sensor at that sounding site. When the resistivity distribution of the subsurface changes from one sounding site to the next, these changes are caused by the movement of the sounding site because the transmitter dipole does not move.

Figure 2:
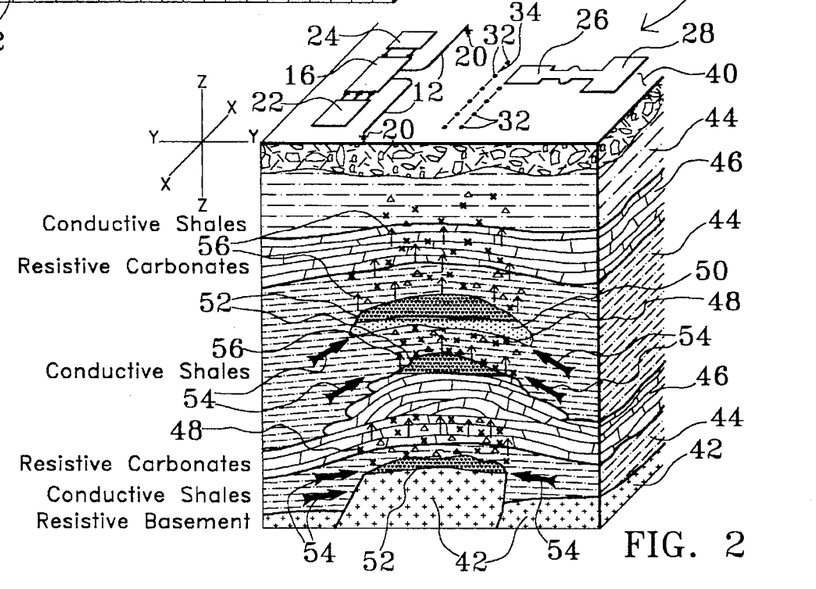
FIG. 2 is another perspective view of a portion of a section of the earth used to illustrate, as an example, the theory behind obtaining results in the formation of robust, well defined, anomalous, deep resistivity patterns associated with hydrocarbon reservoirs.

From one transmission site location many sounding sites, as indicated by darkened dots 32, can be used for receiving and recording in a survey area as shown in FIGS. 1–2. The sounding sites 32 can be along one or many profile lines or in a grid pattern depending on the target and the objective. In this drawing a grid pattern, as indicated by dashed lines 34 along the "X" axis, is being developed with one of the lines 34 completed and a second line 34 partially completed. The drawing shows two undarkened dots 36 which will be the next receiving locations for the magnetic field receiver 26 and data receiving station 28. The distance from the transmission line 12 to the magnetic field receiver 26 is generally 1 to 5 miles, but distances up to 10 miles and more can be used under certain conditions.

In FIG. 1 "r" is a line drawn from the center of the transmission wire 12 to the magnetic field receiver location and "y" is the perpendicular bisector of the transmission line 12. Receiver locations should be placed so that the angle formed between "r" and "y" does not exceed approximately 45 degrees. If the survey extends to an area where this angle exceeds 45 degrees then the transmission line 12 should be moved to accommodate this area.

While receiving and recording from the receiving station 28, in order to improve the signal-to-noise ratio, normally 60 signals are received, summed and stacked. In some cases, as many as 120 to 180 signals are stacked. The number of total signals or cycles may vary, depending upon the amount of noise present at the exploration site and other factors. Stacking is accomplished by a statistical averaging.

In FIG. 2 a perspective view of a portion of sedimentary subsurface geological formations is shown from a ground surface 40 down to a resistive basement 42. The resistive basement 42 generally is made up of an igneous rock formation. The distance from the ground surface 40 down to the basement 42 can be from several feet to 20,000 feet or greater and will vary from location to location around the world. In this illustration, the geology is made up of alternate layers or beds of conductive shales 44 and resistive carbonates 46.

Arrows 48 point to an area where a thinning of the conductive shales 44 and associated rock has occurred above a positive structure as a result of non-deposition and differential compaction. An area 50 of coarse grained sediments is deposited over an area of thinning conductive shales as a result of winnowing. In FIG. 2, three hydrocarbon reservoirs 52 are shown along with a single hydrocarbon reservoir 52 shown in FIG. 1. Arrows 54 illustrate the path of migrating hydrocarbons and associated fluids toward and into the hydrocarbon reservoirs 52. Arrows 56 show the upward vertical seepage of hydrocarbons from the reservoirs 52. Also shown in the drawing are cements (x) and associated minerals (Δ) formed as a result of diagenetic changes caused by the hydrocarbon and fluid migration 54 and vertical hydrocarbon seepage 56.

In viewing FIG. 2, the theory as best understood by the subject inventors, which results in a formation of robust, well-defined resistivity patterns associated with the hydrocarbon reservoirs 52 is now discussed. Oil and gas traps are formed in lithologically and structurally anomalous areas. Oil and gas migrate, along with formation waters, as shown by arrows 54 into the reservoirs 52 (traps) from deeper formations.

During the development of a reservoir 52 and after the development, oil and gas continue their upward seepage as shown by arrows 56. As a result of this continuous process, the hydrocarbon content of the non-reservoir rock adjacent to the top of the reservoirs 52 increases, thereby increasing rock resistivity. In addition, a buildup of porosity modifying cements(x) and minerals(Δ), as a result of diagenetic changes, takes place. The area affected is commonly a large percentage of the total geologic section which may be several thousand feet in many cases. An increase in the carbonate cement and mineral content normally increases the rock resistivity. On the other hand, clays and dendritic metallic minerals, even if they only constitute a small percentage of the rock volume, can decrease the resistivity of the rock.

Formation fluids found in the hydrocarbon reservoirs and traps are normally conductive, especially if they are hypersaline. The lithologic and structural causes of a trap also contribute to the resistivity changes. For example, an upthrown fault block or a reef results in the thinning shown by arrows 48 of overlying conductive shales, thus reducing the total conductance. When differential compaction takes place over structurally high areas, the process of compaction can increase the resistivity of the compacted section. During deposition over a structurally high area, winnowing of sediments results in the deposition of coarse-grained sediments 50. The coarser-grained sediments 50 normally have higher resistivities than finer-grained sediments. In some cases, these coarser-grained sediments 50 can trap hydrocarbons.

In the case of stratigraphic traps, the main causes of resistivity anomalies are increased hydrocarbon content and diagenetic changes. The influence of lithology is generally a minor factor.

The resistivity modifying processes discussed above are closely associated with hydrocarbon reservoirs. Therefore, the prominent anomalous resistivity patterns as provided by the subject invention as described herein have a very close spacial correlation with oil and gas reservoirs in the subsurface.

Referring now to both FIGS. 1 and 2, the grounded transmission lines 12 are used to induce eddy currents in the subsurface. The magnetic field receiver 26 is used to measure the magnetic field signals as a function of time which is equatable with depth. From the magnitude of the measured voltages and using equations derived from Maxwell's equations, apparent resistivity of the earth as a function of time (depth) is calculated at each sounding site 32 along grid lines 34. The information needed is contained in the resistivity curves.

It has been found that all of the resistivity information required can generally be obtained from vertical magnetic fields measured along the "Z" axis as shown in the drawings. However, horizontal magnetic and electrical field components made in a plane in the "X" and the "Y" axis as shown in the drawings can also enhance the anomalous resistivity patterns which are diagnostic of the hydrocarbon accumulations. While the drawings show an orientation along the "X" axis, the apparatus 10 can also be oriented along the "Y" axis for providing similar results.

If the soundings are recorded along a line, in this example along the "X" axis, resistivities are contoured as a function of time in a cross-section form. If the soundings are recorded in a grid pattern, areal resistivity contours can be prepared at different time Intervals.

If a well-defined anomalous resistivity pattern is located, it often represents a hydrocarbon reservoir, in most cases, the anomalous resistivity pattern is observed at a time interval (depth) where an oil and gas deposit is located in the subsurface. The anomalous pattern diminishes towards the surface of the ground earlier in time, away from the reservoir. In some cases shallow resistivity anomalies have been observed. However, shallow resistivity anomalies, without a corresponding deep resistivity anomaly, only indicate resistivity changes of near surface rocks due to weathering, ground water level changes, and surficial lithologic changes rather than a hydrocarbon trap at depth. On the other hand, the observed resistivity anomalies later in time and below a reservoir (in almost all cases), are larger in amplitude and better define the hydrocarbon reservoir.

The causes of the anomaly enhancement at depth are believed to be as follows. As the magnetic field penetrates the sedimentary section, the amplitude of the field changes depending on the resistivity of the layer penetrated. As the field continues downward and encounters a layer with anomalous resistivity value, the magnitude of the field will be altered as a result of penetrating this layer. The effect of this layer on the sounding curve does not end when the magnetic field completes its penetration of this layer. The influence of the layer continues later in time. If there is more than one layer with anomalous resistivities, the effect will be larger and continue later in time. If we think of a large percentage of the section associated with oil and gas traps having anomalous resistivities, then the effect will be much larger and continue at much greater time intervals.

The apparent resistivity versus time curves are also interpreted in terms of a layered earth. As a result, thicknesses and resistivities of up to six geoelectric units or more at each sounding site are determined. From this information, structure, resistivity, thickness and conductance (thickness/resistivity) maps or cross-sections are prepared. This approach works well in areas where soundings without shallow distortions can be recorded. Unfortunately, in many areas there are near surface man-made causes of distortions which occur near the receiver sites such a pipelines, railroad tracks and high tension power lines and natural causes such as surface/ near surface faults, fractures and strong lateral resistivity changes. In these environments, even though the later part of the curve is in almost all cases not distorted, because of the shallow distortions, the multi-layer interpretation approach reflects the distortions in the results. The distortions complicate the anomalous patterns and can produce false anomalies.

In order to overcome the shallow distortion problem, the first 100 to 200 milliseconds, in some cases and much as 500 to 1000 milliseconds of data are discarded when these distortions are present. Since the later parts of the sounding are robust and not distorted, the resulting resistivity cross sections and maps are distortion-free. The mapping is much more reliable than multi-layer interpretation results and has high resolution capability.

Once the undistorted segments of the soundings are secured and the resistivities are contoured, the anomalous resistivity patterns can be enhanced dramatically be removing the regional (background) resistivity pattern from the resistivity contours. For this process the following steps must be taken: (1) Digitize the deep induction resistivity log from a dry or test hole within or near the survey area; (2) Calculate the incremental conductance (thickness/resistivity, or thickness x conductivity), for each digitizing interval (1 to 2 feet) and then integrate the conductance values vs. depth; (3) From the resulting total conductance vs. depth curve, determine up to 6 geoelectric units (layers with somewhat constant resistivity); (4) Using these parameters, at each sounding site, calculate a synthetic resistivity sounding curve. From these calculations, subtract the synthetic resistivity values from the measured resistivity values and contour the residual values. The "system response" (non-linear effects of the receiver apparatus generally resulting from filters), can be convolved with the model before subtraction from the field data. As mentioned above this process removes a horizontally layered earth model from the field data and enhances the resistivity anomalies dramatically.

Most sedimentary basins are gently dipping, 50 feet/mile or less, therefore, removal of a layered earth model from the measured resistivities works well especially since the soundings along sounding sites 32 can be recorded along lines parallel to a strike of the basin. More complex geology such as dipping layers or structures can be removed from the data as well as the simplest case of a homogeneous half-space.

In most cases, measured resistivity patterns associated with hydrocarbon traps do not result in images which mimic the true physical geometry of the trap. This results from the fact that resistivities of the subsurface are dependent not only on lithology, but more strongly dependent on other factors such as porosity, water/hydrocarbon saturation levels of both the reservoir and non reservoir rock, cementation and mineralization levels and thicknesses of the section affected, especially in the presence of a hydrocarbon reservoir. Recognition of this phenomenon and demonstration of the phenomenon by means of recent surveys over various existing oil and gas fields has proved actual reduction to practice of the invention.

In seismic methods, in most cases, a geologic structure or a hydrocarbon trap can be mapped and the image will reflect the actual geometry of the structure. For example, an anticline will manifest itself as an anticline, a horst will look like a horst and a channel will look like a depression in the seismic sections. This is not the case for the subject method. In resistivity measurements, an anticline may look like an exaggerated anticline, but it can also look like an anticline with a depression in the middle where hypersaline formation fluids accompany the oil and gas in addition to conductive clays and pyrite minerals in the upper section. A channel sand which trapped oil or gas may look like a depression due to conductive fluids, minerals, and clays in the overlying section or a gentle anticline because of resistivity increases caused by the increased hydrocarbon content and increased cementation. Also, an anticline can look like a gentle depression, in addition to looking like a depression with highs on the edges. For these reasons, one-dimensional multi-layer interpretation and also two and three-dimensional modeling techniques have difficulty reconstructing the true geometry of hydrocarbon-bearing structures in the subsurface.

In order to obtain a distortion-free total conductance profile or map, the undistorted late time parts of the soundings are used in an asymptotic equation. The results have provided more reliable conductance information than multi-layer interpretation methods.

In the following FIGS. 6–22, a number of examples from actual field surveys over existing hydrocarbon reservoirs and an example over an oil field discovered by the invention are disclosed. In all of the examples, the grounded transmitter 16 and the magnetic field receiver 26 induction coil were used to record the time derivative of the vertical magnetic fields in the time-domain.

When using the apparatus 10 as shown in the drawings and the data received therefrom, the basis of the theory behind the subject invention lies in the use of Maxwell's equations. It should be mentioned that the electromagnetic field behavior is never simple enough to allow for a single simple definition of apparent resistivity valid for all times. Therefore, two equations, one for early-time and the other for ate-times, are used to calculate apparent resistivity. Thus, there are always two apparent resistivities. Early time apparent resistivity is:

$$\rho_a = \frac{2\pi r^5}{3AILy} V(t).$$

and late time apparent resistivity:

$$\rho_a = \left[ \frac{AILy}{40 \pi^{3/2} V(t)} \left( \frac{\mu}{t} \right)^{5/2} \right]^{2/3}$$

Where $V(t)$ is the time derivative of the received vertical magnetic field, I is the transmitter current, L is the length of the transmission line wire, A is the effective receiver coil area (area times turns), t is time, r is the transmitter-receiver distance, and y is the perpendicular component of this distance and $\mu$ is the magnetic permeability of free space.

These definitions of apparent resistivity assume that the received signal is directly proportional to the transmitter moment, IL=M. This works well when the earth is uniform laterally because then the vertical magnetic field is responding only to the current in the transmitter wire. In the case when the earth is not uniform laterally, asymmetric current flow in the earth can create an additional vertical magnetic field component at the receiver. This "distortion" of the received signal is analogous to the static shift problem in magnetotelluric soundings. However, for the system described here, the distortion or static shift caused by asymmetry in current flow near the transmitter can be largely eliminated by referring the signal observed at the receiver location to the static level of the vertical magnetic field at that point instead of the to the moment (M) of the transmitter. The static vertical magnetic field can be calculated by integrating the observed voltage $V(t)$ at the receiver location:

$$Q = \int_0^\infty V(t)dt = -uA \int_0^\infty \frac{\partial H_z}{\partial t} dt = \mu A H_{oz}$$

where Q is the area beneath the observed voltage curve and $H_{oz}$ is the vertical component of the static (zero frequency) magnetic field.

Referring to the literature (Kaufman and Keller, 1983, Frequency and Transient Soundings) we find that the static vertical magnetic field (zero frequency) for a layered earth (or homogenous half-space) using a grounded wire transmitter is derived as:

$$H_{o,z} = \frac{ILy}{4\pi r^3} = \frac{My}{4\pi r^3}$$

Solving these equations for M we obtain the effective moment which would produce the observed static magnetic field:

$$M_{ef} = \frac{4\pi r^3 Q}{\mu Ay}$$

Mef can now be used in place of the real moment M=IL in the equation for early and late time apparent resistivity. The early time apparent resistivity now is:

$$\rho_a = \frac{\mu r^2}{6Q} V(t)$$

and the late time apparent resistivity is:

$$\rho_a = \left[ \frac{\mu^{3/2} r^3 Q}{10\pi^{1/2} t^{5/2} V(t)} \right]^{3/2}$$

These definitions of apparent resistivity show that the accuracy of the normalized voltage transient is independent of the accuracy of the recording equipment. In fact, no knowledge is needed of the sensitivity of the receiving equipment or the moment of the transmitter. This ability to normalize the received voltage curves is unique to this system and is an important feature in the overall scheme to provide high accuracy measurements of the resistivity distribution of the subsurface. Removal of the effects of asymmetric current flow near the transmitter by normalization of the received voltage curves is also important for eliminating the static shift observed between measurements made from two or more transmitter sites. Other state of the art techniques for making resistivity measurements such as direct-current sounding methods and telluric-field sounding methods lack the high precision necessary to accurately measure subsurface resistivity changes caused by the presence of oil and gas accumulations.

Figures 3, 4:
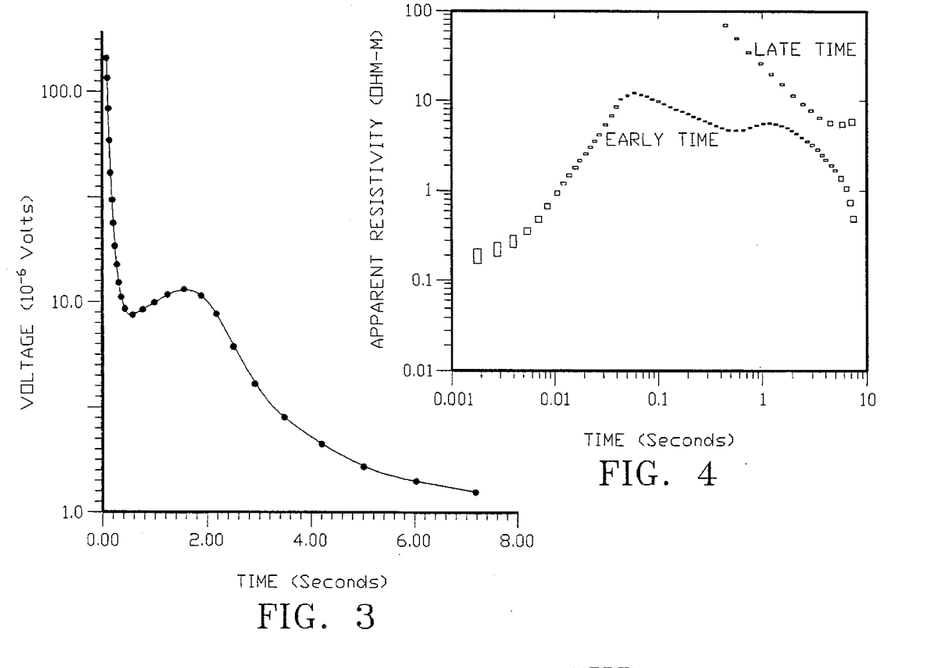
FIG. 3 is a plot of the time derivative of the vertical magnetic field (along the "Z" axis) due to secondary eddy currents in the subsurface induced by a switching of the current by the transmitter at the transmission site.
FIG. 4 is a plot of early and late time apparent resistivity values as a function of time calculated using two equations derived from Maxwell's equations.

At each sounding site 32, the measured voltages as a function of time as shown in FIG. 3 are recorded. From this data and using the above two equations, early and late time apparent resistivities as a function of time are calculated as shown in FIG. 4. The geoelectric information necessary to map hydrocarbon reservoirs is contained in the resistivity curves. Early and late time resistivity values are contoured in the form of cross sections as a function of time if the soundings are recorded along a profile line such as the (X) axis shown in FIG. 1. If the soundings are recorded in a grid pattern such as the grid formed by dashed lines 34, in addition to numerous cross sections, areal contour maps of resistivities at different time intervals can be plotted and studied.

Figure 5:
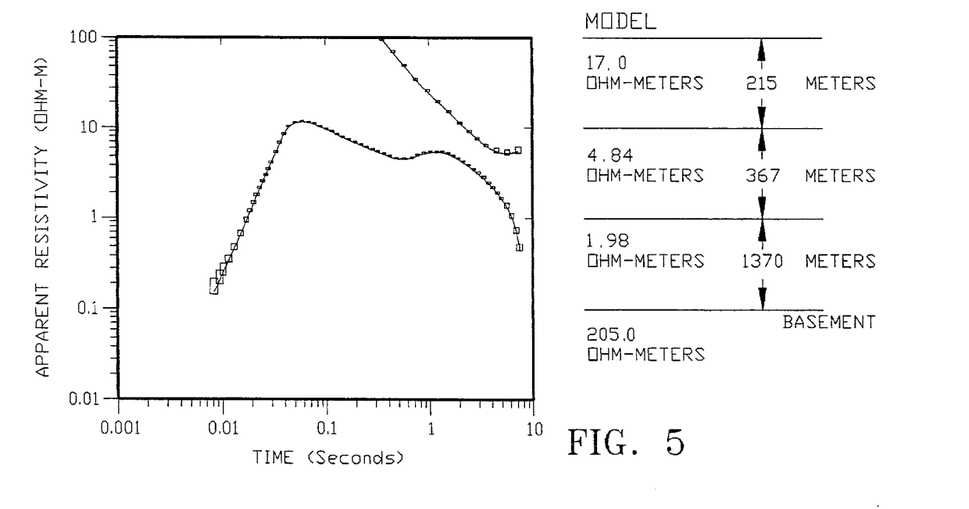
FIG. 5 is a plot of the results of a one dimensional multi-layered interpretation of the early and late time resistivity curves in FIG. 4. The small rectangles are the field data and the heights of the rectangles indicate the level of error (standard deviation) of the field data. The solid lines in the drawing are the synthetic apparent resistivity curves calculated using the best fit layered earth model as shown in this figure.

In areas where the structures are large and have considerable relief or hydrocarbon reservoirs cause prominent resistivity anomalies in the subsurface so that near-surface natural and man-made distortions do not obscure the data, the apparent resistivity curves can be interpreted in terms of a one-dimensional layered earth model with usable results. The inversion algorithm used to interpret these curves is a ridge-regression algorithm for estimating the non-linear model parameters in a least-squares sense. Each sounding is interpreted in terms of a layered earth and the thicknesses and resistivities of each geoelectric unit are printed out as shown in FIG. 5. From these parameters, structural cross-sections or structural areal contour maps of structurally significant boundaries are prepared. Also, thickness or resistivity maps of individual units can be prepared. Further, conductance (thickness/resistivity) values of individual units or the total conductance of a geological section down to the basement can be calculated and plotted.

EXAMPLES

The following examples are the results of actual field surveys over existing oil fields (structural and stratigraphic) and oil and gas prospects.

EXAMPLE 1

Figure 6:
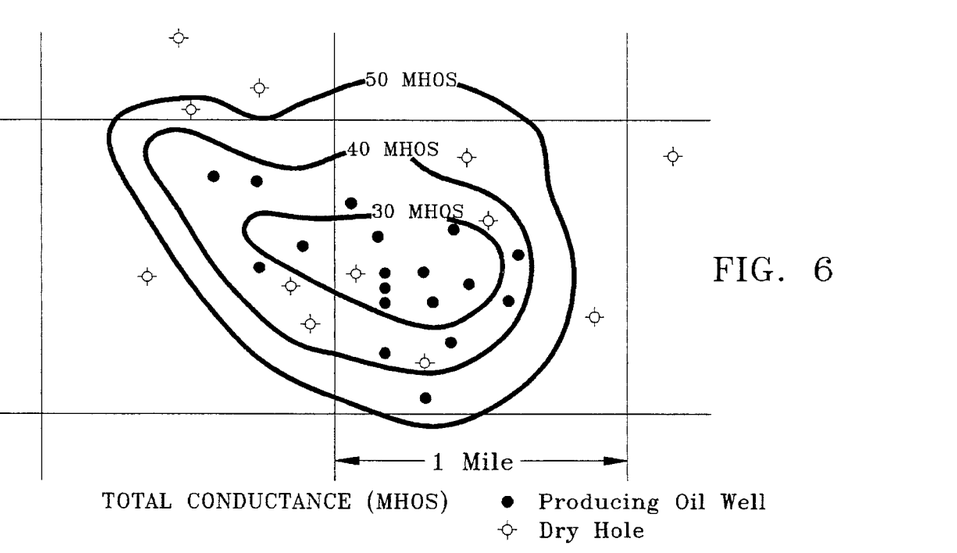
FIG. 6 is an example of a plot of total conductance using the subject invention in an actual survey over an oil field (reef) in the Southeastern Illinois Basin.

FIG. 6 is a contour map of the total conductance of a sedimentary section over a Silurian reef oil field in the southeastern Illinois basin. The producing part of the reef exhibits total conductance values of about 30 mhos. The background is about 50 mhos resulting in a 40% conductance anomaly. The depth to the oil reservoir from the surface is about 1930 feet where the 30 mho contour is located. Along the 50 mho contour the total depth to the reservoir is 2030 feet.

The oil field reef structure shown in this drawing has 100 feet of relief and about 80 feet of closure. 100 feet of relief equates to about 5% of the total depth. The relief of 100 feet does not cause enough thinning in the overlying shales to result in a 40% conductance decrease over the reservoir. The 1930 feet of depth to pay zone with a total conductance of 30 mhos indicates that the section above the reservoir has an average resistivity of 19.6 ohm-meters. The background with 2030 feet of thickness and 50 mhos of conductance, has an average resistivity of 12.4 ohm-meters. These calculations indicate that the resistivity of the section above the reservoir is 32.3% higher than the background values. The main causes of this robust resistivity increase are most likely increased hydrocarbon content and cementation of the non-reservoir rocks above the reservoir. Total conductance mapping works well when the resistivity anomalies are prominent such as in this example. In general, the amplitude of the anomaly increases with the increased size of the relief of the structure and the amount of trapped hydrocarbons.

In this example and the examples shown in FIGS. 7–22, producing oil wells are shown as dark circles with dry holes shown as undarkened circles.

EXAMPLE 2

Figure 7:
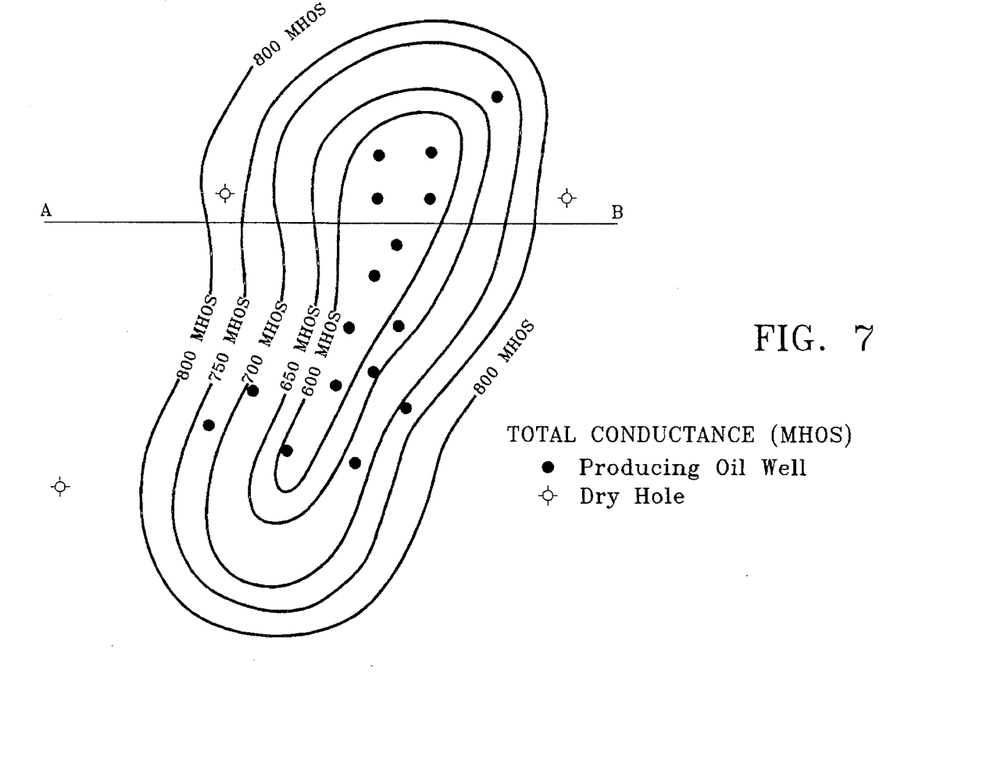
FIG. 7 is a plot of total conductance (over the entire field) and FIGS. 8–9 are examples of plots of early time apparent resistivity along a profile line "AB" from an actual survey of an oil field (offshore bar) in Northeastern Colorado.

FIG. 7 is a contour map of the total conductance of the sedimentary section over an offshore bar sand oil field in eastern Colorado. The producing part of the sand buildup has a total conductance of about 650 mhos. The background conductance is about 800 mhos resulting in a 18.75% conductance anomaly. The maximum thickness of the sand pile is about 45 feet at a depth of about 5620 feet. Where the conductance is 650 mhos, the depth to the reservoir is about 5620 feet which indicates an average resistivity of the section above the reservoir of 2.63 ohm-m. Along the 800 mho contour, the total depth is about 5680 feet which indicates an average resistivity for the same section off the reservoir of 2.16 ohm-m. There is an average 17.9% resistivity increase over the hydrocarbon reservoir. The trap has a total relief of about 40 feet. This translates to less than 1% structural relief which could not have caused a 17.9% resistivity increase over the reservoir. The main causes of this prominent resistivity increase are most likely increased hydrocarbon content and cementation of the non-reservoir rocks above the reservoir.

The total conductance values presented in FIG. 6 and FIG. 7 are calculated using a one-dimensional multilayer inversion scheme. This approach coupled with soundings recorded in a grid pattern, not necessarily in an organized pattern, results in a powerful reconnaissance mapping technique for hydrocarbon exploration. Once areas with resistivity anomalies are mapped using a coarse grid (1000 ft. to 2500 ft.) spacing, a line with closely spaced soundings (300 ft. to 500 ft. apart) can be run across the anomaly to investigate the finer details of the resistivity changes as a function of time. The line AB as shown in FIGS. 7–10 was run for this purpose.

Figure 8:
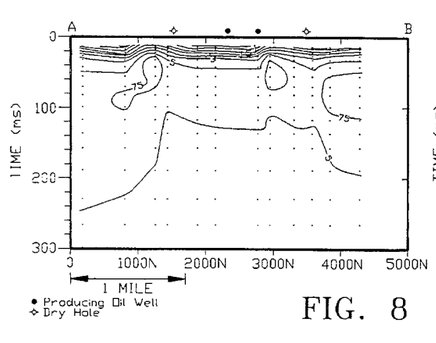

FIG. 8 is a plot of early-time apparent resistivity of the shallow subsurface along the profile line AB as a function of time. The shallow section (within 200 milliseconds), displays a strong resistivity increase above the reservoir. It should be noted that the two dry holes are also slightly within the shallow high resistivity zone.

Figure 9:
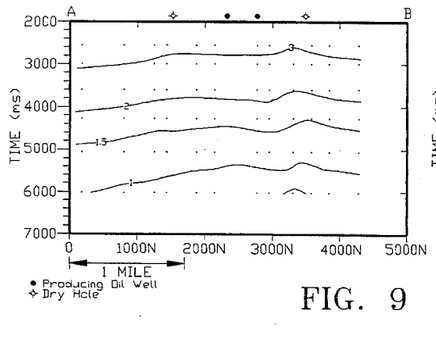

FIG. 9 is a plot of early-time apparent resistivity of the deep subsurface along the profile line AB. The oil wells are located in a gentle depression (more conductive) within a high resistivity anomaly.

Figure 10:
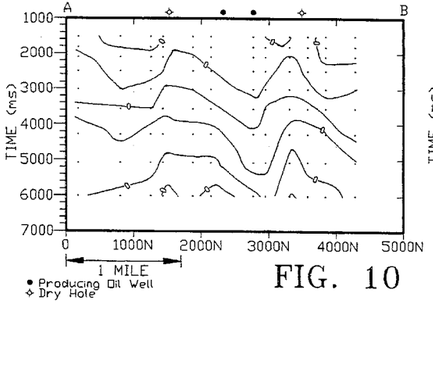
FIG. 10 is an enhanced plot of FIG. 9 after a layered earth model has been removed from the data.

FIG. 10 is a plot of residual voltages of the deep subsurface along the profile line AB. The residual voltage values were determined by removing a horizontally layered earth model from the recorded voltages. A well-defined and dramatic residual contour map emerges and the hydrocarbon reservoir is clearly delineated. The depression in the middle flanked by the highs is where the reservoir is located. Where the reservoir is located, there is a slight, but clearly recognizable (in the residual) reduction in resistivity. This phenomenon is most likely due to conductive formation fluids underlying the hydrocarbons and possibly clays and conductive minerals.

EXAMPLE 3

Figure 11:
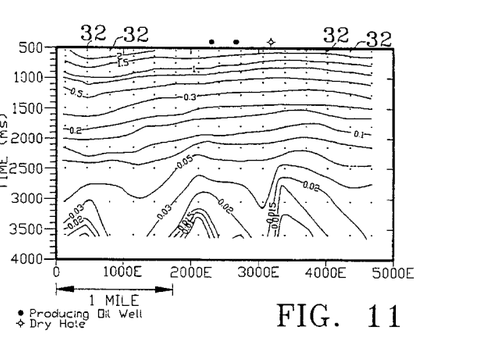
FIG. 11 is an example of a plot of early-time apparent resistivity of a subsurface along a profile line of an actual field test over an oil field in Southwestern Kansas.

FIG. 11 is a plot of early-time apparent resistivity of the subsurface along a profile line of an actual field test over an oil field and an adjacent prospect in southwestern Kansas. This oil field is a structural trap formed by upthrown carbonate fault blocks. The blocks have 500 to 600 feet of relief and the dolomitized carbonates on the tops of these horst blocks are where the hydrocarbons are trapped. After the faulting and the formation of the blocks, additional carbonates were deposited and these horst blocks were buried in carbonates. The younger carbonates are gently dipping and do not represent the relief present at depth.

The resistivity contours down to 2 seconds are monotonous and do not display any anomalous resistivity patterns. Below the second mark, the contours start defining the blocks. Below 2.5 seconds the blocks are well-defined. The two oil wells are located on the block to the left, and the dry hole was drilled between the two blocks. The block to the right has not been tested.

The reservoir is located at a depth corresponding in time to about the 2 second level. The resistivity contours above the 2 second level indicate a roll over above the two horst blocks; however, these contours fail to define the blocks individually. On the other hand, the deeper contours below the 2 second level define the oil producing block and the prospective block in addition to explaining the dry hole. FIG. 11 is a good example of the ability of the invention to enhance the resistivity anomalies present in the sedimentary section. In addition to the enhancement of the resistivity patterns, in later time, the resistivity anomalies thus, the hydrocarbon accumulations are better defined.

The method has the highest degree of resolution at late time among all the inductive sounding methods. The enhancement of the resistivity patterns with increased time (greater depth), and the very close spacial correlation between the hydrocarbon reservoir and the deep resistivity anomaly are important parts of the invention as described herein.

EXAMPLE 4

Figure 12:
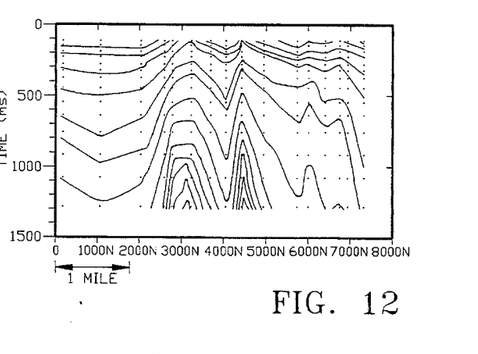
FIG. 12 is an example of a plot of early-time apparent resistivity of a subsurface along a profile line of an actual field test over a gravity anomaly high in northern Ireland.

FIG. 12 is a plot of early-time apparent resistivity of the subsurface along a profile line of an actual field survey over a high gravity anomaly in Northern Ireland. The survey area has about 2,000 feet of basalt at the surface. The underlying conductive sedimentary section which contains the potential reservoir is about 4,000 feet thick. The resistivity anomaly is very prominent, and it has affected the complete section. The trapping structure is expected to be an upthrown fault block. The dramatic nature of the resistivity pattern suggests that hydrocarbon migration has taken place, and that the fault block could have trapped hydrocarbons. Therefore, the area with the resistivity anomaly should be tested with one or more drill holes.

EXAMPLE 5

Figure 13:
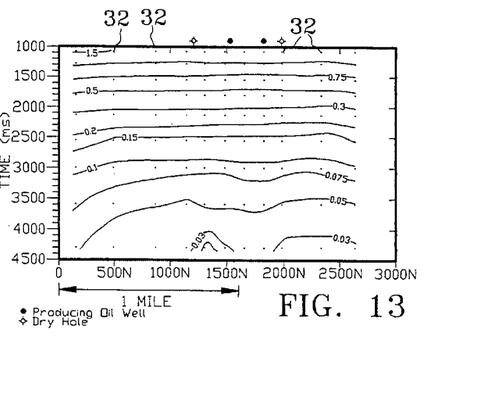
FIG. 13 is an example of a plot of early-time apparent resistivity of a subsurface along a profile line of an actual field test over an oil field (Morrow channel sand) in Eastern Colorado.

FIG. 13 is a plot of early-time apparent resistivity of the subsurface along a profile line of an actual field survey over an oil field in Eastern Colorado. This oil field is a Morrow channel sand field at a depth of about one mile. These stratigraphic traps are difficult to locate with seismic surveys because just the mapping of the channels is not enough since the channels do not always have reservoir sands. When the channels do include sands this does not mean that hydrocarbons are trapped in the sandstones. In this figure the contours above 2.5 seconds indicate a broad gentle resistivity increase with a gentle depression (resistivity decrease) within the high resistivity area. The reservoir is located at about 1.5 seconds. Below 2.5 seconds, the depression (conductive area) becomes more prominent with increasing depth.

Figure 14:
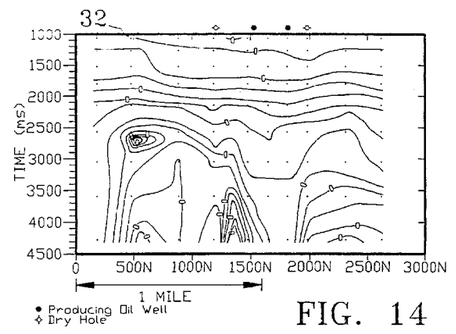
FIG. 14 is an enhanced plot of FIG. 13 after a layered earth model has been removed from the data.

FIG. 14 is a plot of the residual voltages of the subsurface along the same profile line shown in FIG. 13. The residual voltage values were obtained by removal of a horizontally layered earth model from the measured voltages. In this two dimensional mapping, the contours above 2.5 seconds indicate a broad depression. The broad depression defines the boundaries of the channel very well. As indicated by the producing oil wells and the dry holes, the sands within the channel are not productive throughout the channel. The sands to the left of the wells are down-dropped, and are therefore, wet. The contours below 2.5 seconds delineate the reservoir very well. The deep depression which correlates well with the producing oil wells is where the oil reservoir is located.

The resistivity increase in this example is most likely caused by increased hydrocarbon concentration and cementation. The reduction in resistivity (the depression) is probably caused by conductive reservoir fluids and conductive minerals associated with the reservoir.

Figure 15:
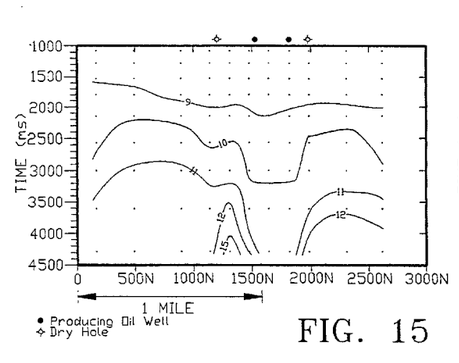
FIG. 15 is a plot of late-time apparent resistivity along the same profile.

FIG. 15 is a plot of late-time apparent resistivity of the subsurface along the same profile line in FIGS. 13–14. It is readily visible that the late-time resistivity values display a much more dramatic resistivity decrease where the oil trap is located. This anomalous behavior becomes more enhanced with increasing time. The phenomenon is due to the high resolution provided by the late-time apparent resistivity values. In this document this is the only example where late-time resistivities are presented. During an actual field survey early-time and late-time resistivities and residuals are plotted in addition to total conductances and individual layer conductances if applicable. There is a sharp resemblance between the late-time resistivities (FIG. 15) and the residual values (FIG. 14) demonstrating the enhancement capability of the residual values.

EXAMPLE 6

Figure 16:
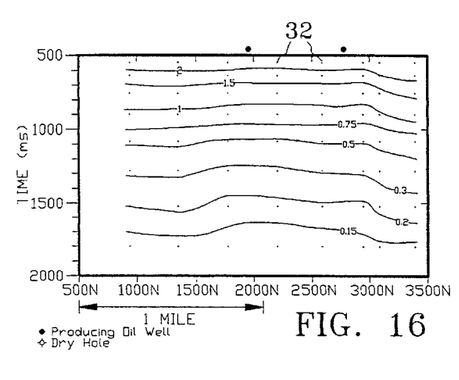
FIG. 16 is an example of another plot of early-time apparent resistivity of a deep subsurface along a profile line of an actual field test over an oil field (Morrow channel sand) in Eastern Colorado.

FIG. 16 is a plot of early-time apparent resistivity of the subsurface along a profile line of an actual field survey over another Morrow channel sand oil field in Eastern Colorado. The reservoir is at a depth of about one mile, which is about 1 second in this area. The resistivity contours in this drawing indicate a resistivity increase above and below the reservoir level in addition to the increase at the reservoir level. This is a well-defined and prominent resistivity anomaly which defines the reservoir very well. Above the reservoir, the amplitude of the resistivity anomaly decreases with increasing distance from the reservoir.

Figure 17:
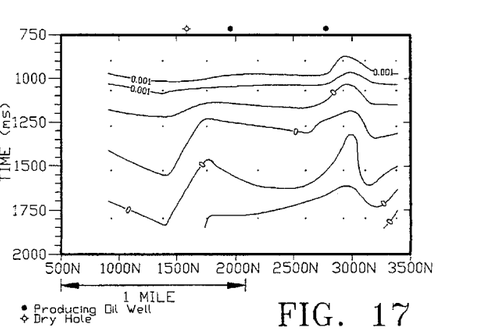
FIG. 17 is an enhanced plot of FIG. 16 after a layered earth model has been removed.

FIG. 17 is a plot of residual voltages of the subsurface along the same profile line in FIG. 16. A well-defined depression in the residual contours in FIG. 17 delineates the oil field very well. The dry hole appears to be on the west edge of the depression. This channel sand is encased in shale (above and below) and due to differential compaction, there is considerable draping of sediments above the sand body. The draping of overlying sediments causes microfracturing through these rocks, and thereby enhances vertical migration of hydrocarbons and fluids, which in turn cause diagenetic changes in the overlying rocks as demonstrated by the resistivity anomaly over this oil field.

Figure 21:
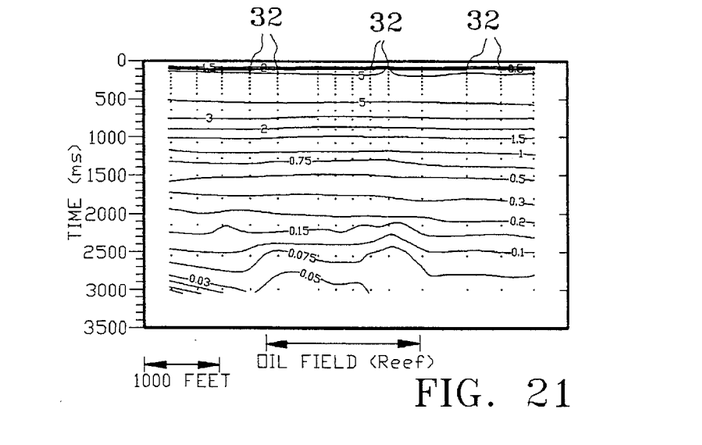
FIG. 21 illustrates a plot of early-time apparent resistivity along a profile line of an actual field survey across a reef oil field in West Texas.

One-dimensional and multi-dimensional electromagnetic modeling techniques which attempt to image the structural attitude of the subsurface rocks will be misled by the strong resistivity changes which have very little to do with structural relief. For example, FIG. 16 and FIG. 21 have similar resistivity patterns; they are both resistivity highs. But FIG. 16 is caused by a channel sand field, and FIG. 21 is caused by a reef field.

EXAMPLE 7 (DISCOVERY)

Figure 18:
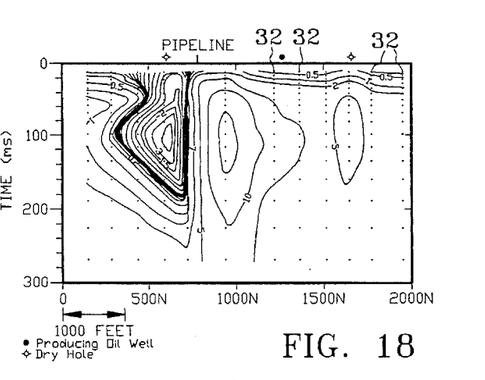
FIGS. 18–19 are examples of another plot of early-time apparent resistivity of a subsurface along a profile line of an actual field test over an oil discovery (Morrow channel sand) in western Kansas with a pipeline crossing the prospect area.

FIG. 18 is a plot of early-time apparent resistivity of the shallow (within 1,000 feet) subsurface along a profile line of an actual field survey over a seismic anomaly in Southwestern Kansas. The purpose of the line was to evaluate a Morrow channel prospect. There is a horizontal pipeline, as indicated in the drawing, across the prospect and the profile line was run across the pipeline. The influence of the pipeline on the measured resistivities is clear. The negative resistivity contours to the left of the pipeline and the positive resistivity contours to the right of the pipeline demonstrate how badly surface and near-surface features can distort the resistivity pattern of the shallow section. In addition to pipelines, railroad tracks, high-tension power lines, fences, and near-surface lithology changes, etc., can also distort the resistivity of the shallow section.

Figure 19:
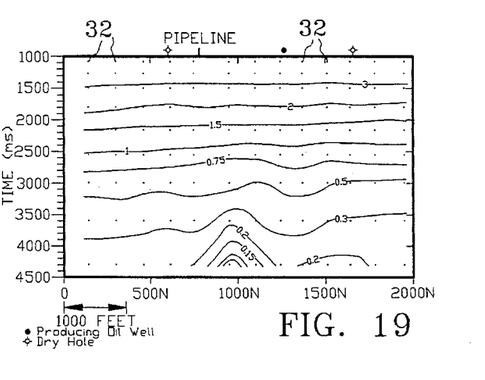

FIG. 19 is a plot of early-time apparent resistivity of the subsurface below the section which was influenced by the pipeline along the same profile line in FIG. 18. In this area, the reservoir is located at about the 1.75 second interval. The dry hole to the right of the well was drilled several years prior to the survey and penetrated 22 feet of channel material. The dry hole to the left of the well was drilled based on seismic data several months prior to the survey. This dry hole penetrated 46 feet of channel material with the bottom 6 feet of the hole drilled into sands with minor amounts of gas. The oil well indicated in this example was drilled subsequent to the survey, and was based on the survey results. The oil well penetrated 125 feet of channel material. The lowest 10 feet of the channel was 14% porosity sandstone, all of which was saturated with high-grade (38 gravity) oil with no water.

In FIG. 19, the reservoir is defined by low resistivities flanked by high resistivities. The anomaly becomes more prominent with increasing time (depth).

Figure 20:
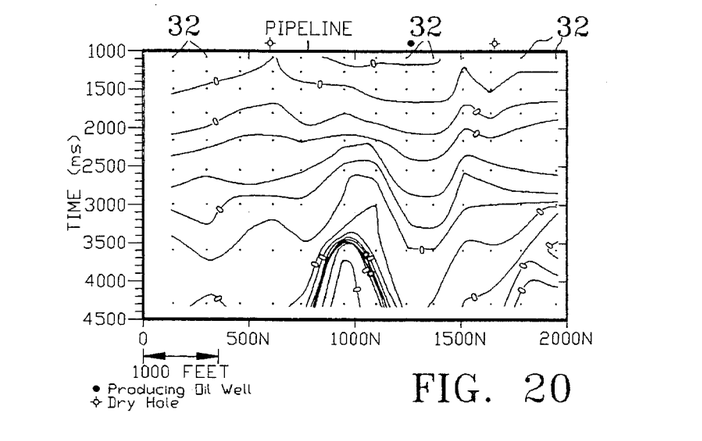
FIG. 20 is an enhanced plot of FIG. 19 after a layered earth model has been removed.

FIG. 20 is a plot of residual voltages along the same profile line shown in FIGS. 18-19. The residual contours enhance the resistivity anomaly thereby delineating the reservoir clearly. The reservoir manifests itself as a depression flanked by highs with the depression becoming more prominent with increasing time (depth). It is important to point out that the influence of the pipeline affected only the shallow section. The resistivity anomaly in the deeper section was not affected. Therefore, the use of the resistivity cross-section and the residual values enabled the mapping of the hydrocarbon reservoir at depth. Heretofore, the use of the multi-layer interpretation techniques under these conditions as described above would have been very difficult or impossible. The recognition of the shallow distortions, and determination of a processing technique to overcome this problem is also a significant part of this invention. There are many areas where surface and near-surface problems, such as near-surface faults, lithologic contacts, changes in the resistivity of the weathered zone, pipelines and railroad tracks, make the use of undistorted electromagnetic field measurements very difficult or impossible, thereby rendering the results useless.

EXAMPLE 8

FIG. 21 illustrates a plot of early-time resistivity along a profile line of an actual field survey across a reef oil field in West Texas. In this area, the sedimentary section is about 5000 feet thick. The section includes an oil producing reservoir which is a reef buildup with 50 to 75 feet of relief. The reservoir is located at a depth of 3200 feet from the surface. In this sedimentary basin 5000 feet corresponds to 1.0 seconds in time.

In this example, the sedimentary section ends at 1.0 seconds. Any time greater then 1.0 seconds corresponds to crystalline basement rocks below the sedimentary section. The productive reef is located at about 0.8 seconds in the cross-section. There are visible changes (roll over) in the contours above the 1.0 seconds mark. However, the changes are much larger below 2.0 seconds and they are very well defined below a 2.5 seconds mark. Even though the oil trap is located at 0.8 seconds and the sedimentary section ends at about 1.0 seconds, the method as described herein is pointing out a robust resistivity anomaly below 2.5 seconds and this anomaly correlates with the oil field.

The above described phenomenon is one of the special qualities of the invention as described. Previous exploration methods focused only on data related to the sedimentary section where oil and gas deposits are found. Therefore, until now no one has used data looking later in time correlating to the basement of the sedimentary section for information when looking for oil and gas traps in the sedimentary section above.

Figure 22:
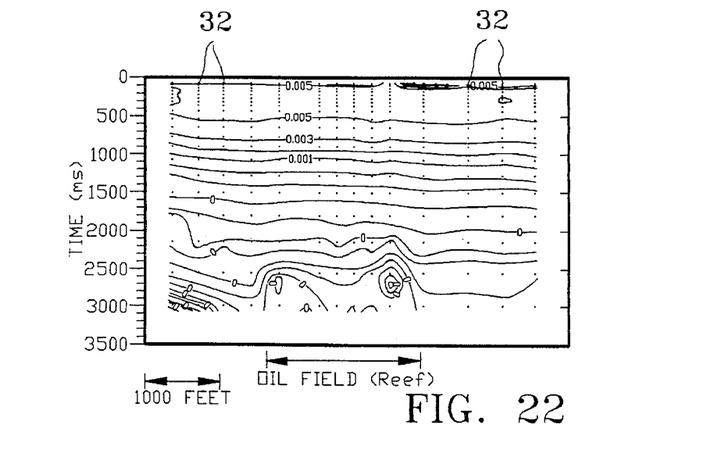
FIG. 22 is an enhanced plot of FIG. 21 after a horizontally layered earth model that has been removed from the data, thereby enhancing the reef anomaly.

In FIG. 22 as shown, the resistivity patterns illustrated in FIG. 21 are enhanced further by removing a background from the recorded voltages. In order to accomplish this, a horizontally layered earth model is removed from the data. Not only does this process enhance the resistivity anomaly as shown in FIG. 21, it also removes the effect of the recording array geometry. The effects of the recording array geometry are changes in the resistivity patterns caused by variations in "r". Where "r" is the distance between the sounding location and the center of the transmitter, such changes are not related to actual changes in the earth. Therefore, the resulting contours represent the resistivity distribution of the subsurface in that area. As mentioned above and which confirms a major phenomenon when using the subject invention is that the dramatic resistivity changes observed below 2.5 seconds are a result of the resistivity changes caused by the oil field located at about 0.8 seconds as shown in FIGS. 21–22.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. An apparatus used on a ground surface in providing resistivity measurement data of a sedimentary subsurface for developing and mapping an enhanced anomalous resistivity pattern, the enhanced underground resistivity pattern associated with and an aid for finding oil and gas traps at various depths down to a basement of the sedimentary subsurface, the apparatus comprising:

an electric generator connected to a transmitter with a length of transmission wire disposed on the ground surface at a transmission site, said generator and transmitter sending square waves of switched dc current from the transmission site through said transmission wire, the switching of current inducing eddy currents in the subsurface, the eddy currents inducing magnetic fields in the subsurface;

magnetic field receivers disposed on the ground surface at a plurality of sounding sites for receiving and recording vertical magnetic field signals from the generated magnetic fields; and data processing and computing equipment means connected to said magnetic field receiver for deducing resistivity variations of the subsurface from the amplitude and shape of the measured magnetic field signals as a function of time equatable to depth using appropriate mathematical equations, wherein said data processing and computing equipment means connected to said magnetic field receiver for deducing resistivity variations of the subsurface from the amplitude and shape of the magnetic field signals as a function of time equatable to depth using appropriate mathematical equations produces interpretable and robust resistivity measurement data of the sedimentary subsurface in the presence of shallow resistivity distortions near the sounding site by discarding resistivity data as a function of time from 0 milliseconds up to such times whereby the effect of the shallow resistivity disturbance has ceased and the remaining resistivity data is contoured accordingly, said shallow resistivity distortions being caused by pipelines, powerlines, metal fences, railroad tracks, surface weathering, lithology changes and surface expressions of faults and fractures.

2. The apparatus as described in claim 1 whereby the sounding sites are arranged in a plot-like manner to ensure that areal contour maps and cross sections of the resistivity variations of the subsurface structure can be prepared, the spacing between said sounding sites in a range from 200 feet to 3000 feet depending upon the size of the exploration target, the angle from a perpendicular bisector of said transmission wire to a line between the sounding site and a center of said transmission wire not exceeding approximately 45 degrees, and the distance from said transmission line to the sounding site in a range of one mile to eight miles.

3. The apparatus as described in claim 1 wherein said data processing and computing equipment means connected to said magnetic field receivers for deducing resistivity variations of the subsurface from the amplitude and shape of the magnetic field signals as a function of time equatable to depth using appropriate mathematical equations measures the resistivity variations of the subsurface down to and including a portion of the basement of the sedimentary subsurface under investigation.

4. The apparatus as described in claim 1 wherein said data processing and computing equipment means connected to said magnetic field receivers for deducing resistivity variations of the subsurface from the amplitude and shape of the measured magnetic field signals measured as a function of time equatable to depth and using appropriate mathematical equations produces interpretable and robust resistivity measurement data of the sedimentary subsurface in the presence of asymmetric current flow near said transmitter that causes a distortion or static shift in the received vertical magnetic field signals by referring the signal observed at each sounding site location to the static (zero frequency) vertical magnetic field at each location instead of to the moment (M≡IL) of said transmitter which in effect normalizes the received magnetic field signals, which are recorded as time-varying voltages, to the numerical integration of the recorded magnetic field signals which is in effect the area beneath the observed voltage curve, whereby this normalization process causes the received signal to be independent of the accuracy of said data processing and computing equipment and independent of the transmitter moment (M≡IL).

5. The apparatus as described in claim 1 wherein said transmission wire is disposed along a horizontal axis with the opposite ends of said wire connected to grounded electrodes, said electrodes being separated from two thousand feet to four miles, and wherein the period of the square waves transmitted from said wire is in a range from 1 second to 50 seconds and the amplitude of the square waves transmitted is in a range of 50–400 amperes.

6. The apparatus as described in claim 1 wherein said transmission wire is formed in a square shaped loop array and disposed along a horizontal ground surface, the length of one side of said square loop being two thousand feet to four miles.

7. The apparatus as described in claim 2 wherein said field receivers also receive and record horizontal electric fields and horizontal magnetic fields to further enhance the resistivity patterns of the subsurface.

8. The apparatus as described in claim 1 wherein said generator and transmitter also send sine waves through said transmission wire over a range of 0.02 to 100 Hz and the resulting measurements are plotted in the frequency domain; and time domain signals resulting from the square wave input by said generator and transmitter are transformed into the frequency domain and plotted as a function of frequency.

9. The apparatus as described in claim 1 wherein said magnetic field receivers are induction coils, induction loops, and magnetometers and the magnetic field changes are recorded as time-varying voltages.

10. The apparatus as described in claim 1 wherein a resistivity pattern of a subsurface recorded at a particular sounding site is the resistivity pattern of the earth directly below that sounding site.

11. An apparatus used on a ground surface in providing resistivity measurement data of a sedimentary subsurface for developing and mapping an enhanced anomalous resistivity pattern, the enhanced underground resistivity pattern associated with and an aid for finding oil and gas traps at various depths down to a basement of the sedimentary subsurface, the apparatus comprising:

an electric generator connected to a transmitter with a length of transmission wire disposed on the ground surface at a transmission site, said generator and transmitter sending square waves of current from the transmission site through said transmission wire, the switching of current inducing eddy currents in the subsurface, the eddy currents inducing magnetic fields in the subsurface;

a magnetic field receiver disposed on the ground surface at a plurality of sounding sites for receiving and recording vertical magnetic field signals from the generated magnetic fields; and data processing and computing equipment means connected to said magnetic field receiver for deducing resistivity variations of the subsurface from the amplitude and shape of the measured magnetic field signals as a function of time equatable to depth using appropriate mathematical equations, the sounding sites arranged in a plot-like manner to insure that areal contour maps and cross-sections of the resistivity variations of the subsurface structure can be prepared, whereby said data processing and computing equipment means connected to said magnetic field receiver for deducing resistivity variations of the subsurface from the amplitude and shape of the magnetic field signals as a function of time equatable to depth using appropriate mathematical equations measures interpretable and robust resistivity variations of the subsurface down to and including a portion of the basement of the sedimentary subsurface under investigation, wherein said data processing and computing equipment means connected to said magnetic field receiver for deducing resistivity variations of the subsurface from the amplitude and shape of the magnetic field signals as a function of time equatable to depth using appropriate mathematical equations produces interpretable and robust resistivity measurement data of the sedimentary subsurface in the presence of shallow resistivity distortions near the sounding site by discarding resistivity data as a function of time from 0 milliseconds up to such time whereby the effect of the shallow resistivity disturbance has ceased and the remaining resistivity data is contoured accordingly.

12. The apparatus as described in claim 11 wherein said data processing and computing equipment means connected to said magnetic field receiver for deducing resistivity variations of the subsurface from the amplitude and shape of the measured magnetic field signals calculates the total conductance of the geologic subsurface and selected geologic intervals using a one-dimensional and multi-dimensional inversion of the recorded vertical magnetic fields and also calculates total conductance using an asymptotic equation which values are plotted to form a profile and a horizontal grid of conductance values which can be contoured to show areas of anomalous resistivity patterns relating to accumulations of oil and gas and whereby an asymptotic equation is applied to resistivity sounding curves calculated from the vertical magnetic fields plotted as a function of time equatable to depth and the cross-sections and areal contour maps of these conductance variations are prepared to show changes in the subsurface related to oil and gas accumulations.

13. A method used in providing resistivity measurement data of a sedimentary subsurface for developing and mapping an enhanced anomalous resistivity pattern, the enhanced underground resistivity pattern associated with and an aid for finding oil and gas traps at various depths down to a basement of the sedimentary subsurface, the steps comprising:

generating and transmitting a plurality of large-amplitude, long-period square waves of current from an electric generator connected to a transmitter with a length of wire disposed on the ground surface at a transmission site and tied to grounded electrodes at each end of the wire;

inducing eddy currents in the subsurface, the eddy currents inducing vertical magnetic fields in the subsurface;

receiving and recording vertical magnetic field signals from the generated vertical fields in the subsurface using a magnetic field receiver disposed on the ground surface at a plurality of sounding sites;

data processing and computing voltage values of the vertical magnetic fields received from said magnetic field receiver;

deducing resistivity variations of the subsurface rock from the amplitude and shape of the measured magnetic field signals based on a function of time equatable to depth after using appropriate mathematical equations for mapping the resistivity patterns associated with oil and gas accumulations; and enhancing the resistivity patterns by removing a background from the resistivity data and voltage data, the background being a synthetic sounding curve calculated from a horizontally layered earth model, whereby the resulting contours formed represent the enhanced resistivity distribution of the subsurface being investigated.

14. The method as described in claim 13 wherein the step of data processing and computing voltage values of the vertical magnetic fields received from said magnetic field receiver includes plotting resistivity curves from which thicknesses and resistivites of the geoelectric units of the subsurface below the sounding site are calculated and in order to delineate the hydrocarbon traps, resistivites, conductivites (1/resistivity), conductance (thickness/resistivity), thicknesses of geoelectric units and structure maps and cross-sections and a combination of the above mentioned parameters are plotted in addition to plotting only the vertical magnetic field transient voltage signals and these same voltage signals enhanced by subtracting a synthetic voltage signal calculated from a layered-earth model.

15. The method as described in claim 13 wherein the steps of processing and computing the magnetic field signals and deducing resistivity variations of the subsurface from the amplitude and shape of the measured magnetic field signals measured as a function of time equatable to depth using appropriate mathematical equations for mapping the resistivity patterns includes a further step of measuring the vertical magnetic fields as time varying voltages from time "0" corresponding to an instant in time where the current in the transmitter is switched, which time "0" also corresponds to the surface of the earth in terms of depth, to later times when the eddy currents have penetrated deeper into the sedimentary sections and finally into the crystalline basement and further to later times when the eddy currents will have penetrated a greater distance into the basement in order to further enhance the anomalous resistivity patterns developed at earlier times due to the presence of a layer of rock which has been affected by an oil or gas accumulation which resistivity patterns are further enhanced (become larger) later in time because the magnetic fields are still being affected by the anomalous resistivity patterns encountered earlier in time (shallower in the section) although these later times correspond to depths well into the basement, and in addition to the amplitude of the resistivity anomaly associated with hydrocarbon traps becoming larger with increasing time (depth), the resistivity pattern at depth (which corresponds in time to the crystalline basement and beyond) defines the lateral extent of the hydrocarbon accumulations more precisely because with increasing time (depth) the lateral resolution capability increases dramatically.

16. The method as described in claim 13 wherein the steps of processing and computing the magnetic field signals and deducing resistivity variations of the subsurface from the amplitude and shape of the measured magnetic field signals based on a function of time equatable to depth using appropriate mathematical equations for mapping the resistivity patterns further includes the step of producing interpretable and robust and accurate resistivity measurement data of the sedimentary subsurface in the presence of shallow resistivity distortions near the receiver site and in the presence of asymmetric current flow near the transmitter by discarding resistivity data as a function of time from 0 milliseconds up to such times, whereby the effect of the shallow resistivity disturbance has ceased and the remaining resistivity data is contoured accordingly eliminating resistivity variations of shallow subsurface measurements thereby removing misleading data which will interfere with the enhanced anomalous resistivity pattern, and by referring the observed signal at each recording site to the static magnetic field which normalizes the received magnetic field signals to the numerical integration of the magnetic field signal and eliminates any static shift of these signals.

17. The method as described in claim 13 wherein the steps of processing and computing the magnetic field signals and deducing resistivity variations of the subsurface from the amplitude and shape of the measured magnetic field signals measured as a function of time equatable to depth using appropriate mathematical equations for mapping the resistivity patterns includes a further step of enhancing the resistivity patterns by removing associated recording array geometry caused by variations in the distance between each sounding site location and the center of the transmitter and accomplishing this removal of array geometry by accounting for it in the calculation of the synthetic sounding curves based on a layered earth model which are subtracted from the resistivity data and voltage data.

* * * * *